A. CROSBY.

FLUE-CLEANER.

No. 7,126. Reissued May 23, 1876.

Witnesses.

Otto Schifeland.

Robt E. Miller

Inventor

Addison Crosby per

Van Santvoord & Hauff

Attorneys

N. PETERS, PHOTO-LITHOGRAPHER, WASHINGTON, D. C.

UNITED STATES PATENT OFFICE.

ADDISON CROSBY, OF NEW YORK, N. Y.

IMPROVEMENT IN FLUE-CLEANERS.

Specification forming part of Letters Patent No. 156,543, dated November 3, 1874; reissue No. 7,126, dated May 23, 1876; application filed May 2, 1876.

*To all whom it may concern:*

Be it known that I, ADDISON CROSBY, of the city, county, and State of New York, have invented a new and useful Improvement in Boiler-Flue Cleaners, which improvement is fully set forth in the following specification, reference being had to the accompanying drawing, in which—

Figure 1:
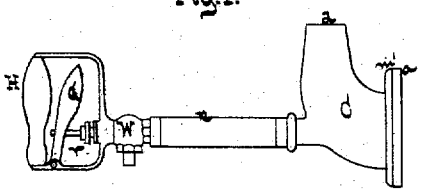
Figure 2:
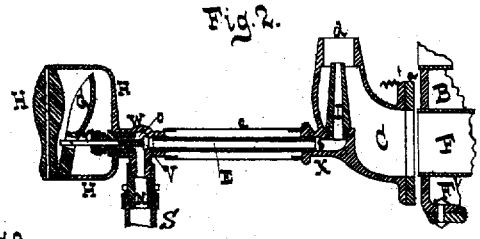
Figure 3:
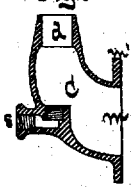
Figure 4:
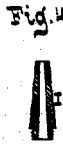
Figure 5:
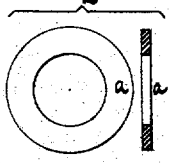
Figure 6:
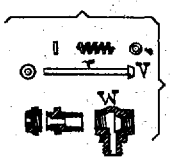
Figure 7:
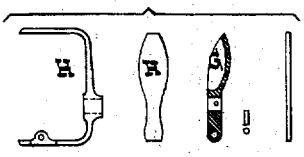

Figure 1 is a side elevation. Fig. 2 is a vertical section, showing the application of the instrument to a boiler-flue.

The remaining figures are details, which will be referred to as the description progresses.

Similar letters indicate corresponding parts.

This invention relates to that class of devices for cleaning the fire-flues of steam-boilers in which a jet of steam is thrown into a movable pipe to be applied to each flue, so as to create a suction-draft, which draws out the soot from the open flue, and may be considered an improvement on the flue-cleaner described in Norman W. Wheeler's patent, No. 51,249, dated November 28, 1865.

The chief feature of my improvement consists in having the discharge-mouth of the suction-pipe of a much reduced area as compared with the flue-mouth; also, in providing the flue-mouth with a flange and packing-ring, so that when the suction-pipe is pressed up against the flue-sheet of the boiler a tight joint will be produced, and the full force of the suction is rendered available for cleaning the flue; also, in the peculiar means for supporting the instrument and for operating the steam-supply valve, as hereinafter more fully explained.

In the drawing, the letter B designates a section of a boiler, and F a section of a flue, which is secured in the flue-sheet F′. C is the suction-pipe, made of cast-iron or any other suitable material. The mouth *m*, which is applied to and over the flue to be cleaned, is provided with a flange, *m′*, which is faced with a rubber ring, *a*, and the inner diameter of said mouth is somewhat greater than the outside diameter of the flue F, so that the rubber-faced flange *m′* can be brought to bear flat against the outer surface of the flue-sheet F′, producing a tight joint, and preventing the entrance of air between the flange *m′* and the flue-sheet. This feature is very essential for the success of the operation, for if the joint between the flue-sheet and the suction-pipe is not tight, the force of the suction is broken, and the soot is but imperfectly removed from the flue.

The suction-pipe is reduced from the flue-mouth *m* toward its discharge-mouth *d*, the area of the cross-section of the latter being about one-fourth of that of the area of the flue-mouth. This reduction greatly increases the power of the draft, and enables me to remove from the flue not only that portion of the soot which lies perfectly loose therein, but also such portions which may adhere to each other or to the inner surface of the flue.

With the suction-pipe C is combined a steam-jet, I, being about three-quarters of an inch in diameter at its butt, where it is screwed into a socket, *s*, formed for its reception in the suction-pipe, and being about half an inch at its nozzle, which discharges its jets of steam about two inches within the discharge-mouth *d*. I prefer that the steam-jet should be a reducing-pipe, but the reduction is not indispensable.

E is a pipe some two or three feet long and about three-quarters of an inch in diameter, and connects with the socket S of the suction-pipe C. The pipe E is surrounded by a wooden jacket, *e*, so that it may be used as a handle in applying the instrument. W is an angle valve-seat, screwed to the outer end of the pipe E. A screw-nipple, N, is secured to the seat W for the attachment of a three-quarter-inch flexible steam-hose, S. With the seat W is combined a stirrup-handle, H, for convenience in applying the instrument. To this stirrup is pivoted a gripe-lever, G, which connects at its middle with the valve-stem *r*, so that the hand of the operator, while grasping the handle H, may also gripe the lever G, and thus admit the steam.

The operation is as follows: The pipe S is attached to the steam-space of the boiler. The mouth *m* of the suction-pipe C is then applied over the flue to be cleaned and pressed against it, so as to make a tight joint. By griping-lever G the valve V is opened and a jet of steam is admitted, which rushes through pipe E and nozzle I into and out of discharge-mouth *d*, thereby creating a suction, the force of which is intensified by the form of the suction-pipe and by the rubber-faced flange *m'*, and which creates a powerful current of air through the open flue F, thus clearing out its soot and other injurious contents.

Instead of taking in the steam, as shown, at an angle to the line of discharge, it is possible to take it in a direct line from the boiler at the point marked X, and the same result will ensue.

What I claim as new, and desire to secure by Letters Patent, is—

1. In a boiler-flue cleaner, the combination of a suction-pipe, which is reduced from its flue-mouth to its discharge-mouth, and provided with a steam-jet, a steam-supply pipe, and controlling valve, substantially as and for the purpose set forth.

2. In a boiler-flue cleaner, the combination, with a suitable handle and with a steam-pipe, I, of a suction-pipe, C, provided with a flange, *m'*, faced with rubber or other packing material, substantially as set forth.

3. The combination of the reduced suction-pipe C, jet I, pipe E, handle *e*, supply-pipe S, and controlling-valve, substantially as and for the purpose described.

4. The combination of suction-pipe C, jet I, pipe E, handle *e*, valve-seat W, valve V, stirrup H, lever G, and supply-pipe S, substantially as and for the purpose set forth.

In testimony that I claim the foregoing I have hereunto set my hand and seal this 25th day of April, 1876.

ADDISON CROSBY. [L. S.]

Witnesses:

W. HAUFF,

E. F. KASTENHUBER.